May 3, 1932.  J. B. GLOWACKI  1,857,095
PHYSICIAN'S HEAD MIRROR
Filed Nov. 29, 1929
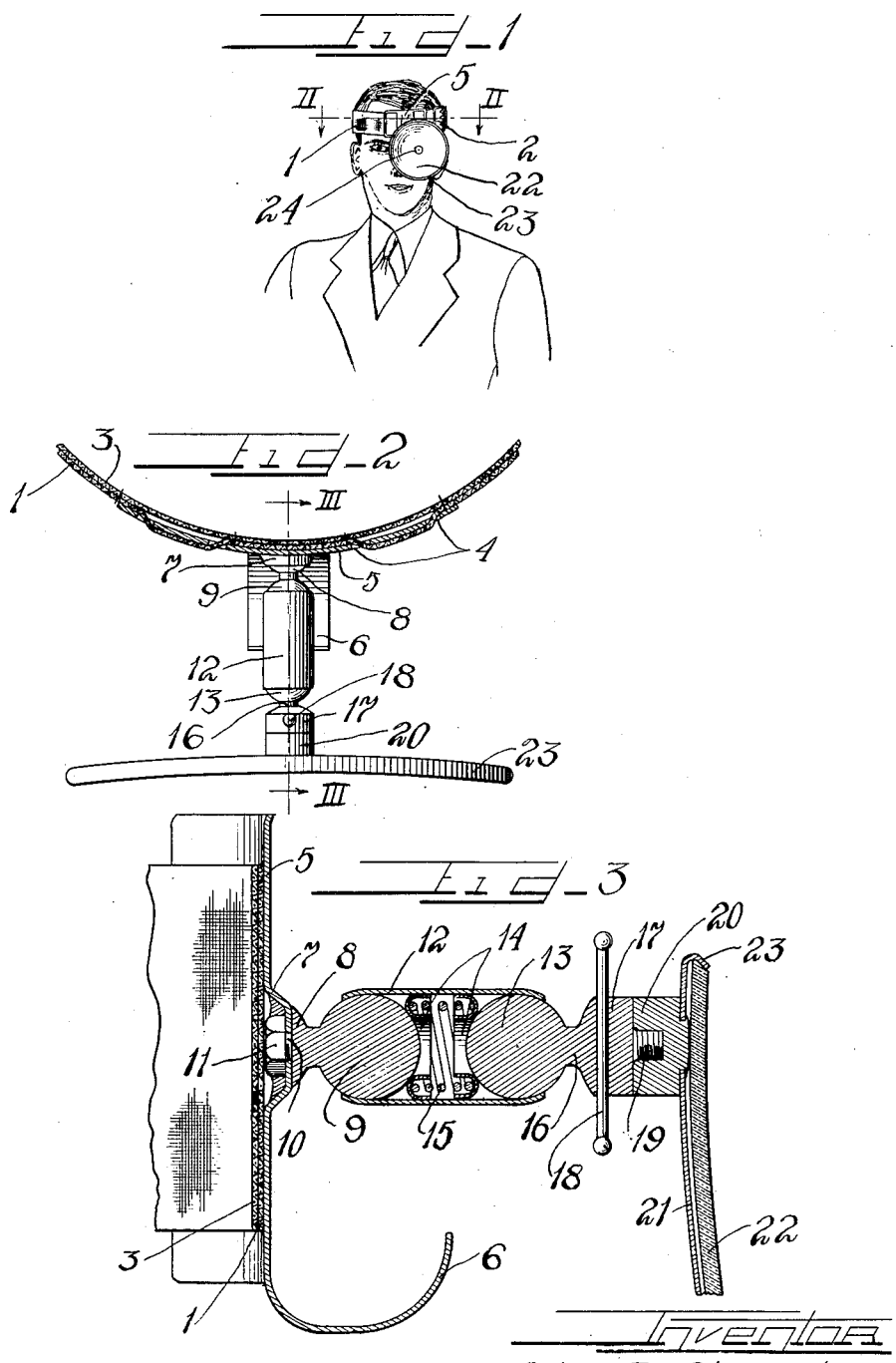
Inventor
John B. Glowacki
by Charles Hill
Attys Patented May 3, 1932

1,857,095

UNITED STATES PATENT OFFICE

JOHN B. GLOWACKI, OF CHICAGO, ILLINOIS

PHYSICIAN'S HEAD MIRROR

Application filed November 29, 1929. Serial No. 410,544.

Heretofore, physicians' head mirrors have been constructed to include a head band supporting a metal plate having a socket formed thereon for the reception of a ball member which was rigidly secured on the back of a mirror and adapted to be engaged in the socket on the supporting plate to permit movement of the mirror. This arrangement necessitated separation of the ball and socket members each time a physician required a different size mirror, which change necessarily delayed operations, thereby making changes of mirrors on the head band extremely annoying.

This invention has been devised to provide an improved physicians' head mirror in which a head band is provided to support a mounting plate having supported thereon a double ball and socket joint, the outer ball member of which is provided with a screw member on which internally threaded shanks or sleeves integrally formed on the backs of mirrors are adapted to be removably engaged without necessitating any separation of the parts forming the double universal union.

It is an object of this invention to provide an improved physician's head mirror wherein the head band is provided with a plate having a finger piece to facilitate adjustment of the head band and wherein the plate is also provided with a double universal joint adapted to permit different size mirrors to be conveniently mounted or disengaged.

It is also an object of this invention to provide a physician's head mirror wherein a head band is provided with a mounting plate carrying a double ball-and-socket union, one of the ball members of which is provided with a screw device permitting mirrors of different sizes or of different styles to be conveniently supported in position on the double ball-and-socket joint without necessitating interference with the construction of the joint.

It is furthermore an object of this invention to provide a physician's head mirror wherein the head band has a supporting plate mounted thereon and provided with a finger piece to facilitate adjustment of the head set.

It is an important object of this invention to provide a physician's head mirror wherein a head plate is provided with a finger piece to facilitate adjustment of the head set and wherein said head plate is also provided with a double ball-and-socket spring-controlled union, the outer ball member of which is provided with a screw device adapted to permit head mirrors of different sizes or styles to be conveniently threaded onto the screw member without necessitating any changes or separation of the parts forming the universal joint.

Other and further important objects of this invention will be apparent from the disclosures in the specification and the accompanying drawings.

The invention (in a preferred form) is illustrated in the drawings and hereinafter more fully described.

On the drawings:

Figure 1 illustrates a front view of an individual wearing an improved physician's head mirror embodying the principles of this invention.

Figure 2 is an enlarged sectional view of the improved physician's head mirror taken on line II—II of Figure 1, with parts of the bank broken away and shown in section.

Figure 3 is an enlarged fragmentary detailed section of the device taken on line III—III of Figure 2.

As shown on the drawings:

The reference numeral 1 indicates a head band constructed of tape or ribbon or any other suitable material having engaged thereon a buckle 2 to facilitate mounting of the same. A liner strip 3 is provided on the head band. The portion of the head band 1 positioned immediately in front of the liner strip 3 is laced or threaded through a series of slots 4 provided in a head plate 5 which is constructed of metal or other suitable material. The mounting or head plate 5 is curved to conform to the curvature of a person's forehead to permit convenient positioning of the head plate when the device is used. Integrally formed on the lower margin of the head plate or mounting plate 5 is a finger piece or handle 6 provided to facilitate adjustment of the mounting plate and the head band on a person's head.

Integrally formed on the middle portion of the head plate 5 is a boss 7, against which the base 8 of a ball member 9 is adapted to seat. A screw member 10 is integrally formed on the base of the ball member 9 and projects through an opening in the boss 7 to permit a nut 11 to be threaded onto the inner end of the screw to rigidly hold the ball member 9 secured in position upon the front of the head plate 5. While the main or primary ball member forming part of the double universal joint has been described as being secured to the head plate 5 by means of a screw and nut arrangement, it will, of course, be understood that any other method may be used for rigidly securing the ball member 9 in place.

Movably engaged on the main or primary ball member 9 is one end of a double socket sleeve 12 having a secondary or auxilary ball member 13 movably engaged in the opposite end thereof. Slidably engaged in the double socket sleeve 12 between the ball members 9 and 13 is a pair of hollow or U cross section rings or followers 14, the open ends of which are directed inwardly toward one another and have engaged therein the ends of a coiled control spring 15. The control spring 15 serves to spring the followers 14 apart and to hold the same in frictional engagement with the inner ends of the ball members 9 and 13, as clearly illustrated in Figure 3. The spring 15 thus serves to hold the ball members 9 and 13 in the rounded socket ends of the double socket sleeve 12. Integrally formed on the secondary or auxiliary ball member 13 is a neck or stem 16, on the outer end of which a head 17 is integrally formed. The head member 17 is provided with a diametrical passage or opening through which a double-headed pin or bar 18 is slidably engaged. The pin or bar 18 is provided to facilitate holding of the head 17 on the outer end of which a screw member 19 is integrally formed.

The screw member 19 is provided to afford a suitable support for an internally threaded sleeve or boss 20 which is rigidly secured on the back 21 of a physician's mirror 22. The mirror back 21 is provided with a suitable grooved rim 23 for holding the mirror 22 in place. The mounting boss or sleeve 20, provided on the back of the mirror is secured in position near the outer periphery of the mirror to permit the aperture 24 to be conveniently positioned in front of one of the eyes of a person using the mirror when the device is supported in position on the person's head as illustrated in Figure 1.

The improved attaching arrangement, whereby the mirror may be removably supported on the outer screw member 19 forming part of the double universal socket or joint which is supported on the head plate 5, permits mirrors of different sizes and types to be readily mounted in position upon the double universal socket. The mounting or removal of mirrors from the double socket joint may be readily accomplished with the assistance of the handle bar or pin 18. The double universal joint connection between the removable mirror and the head plate 5 permits the mirror to be moved universally in all directions, and the finger piece or handle 6 on the head plate 5 permits the entire device to be raised, lowered, or adjusted on the forehead of a person using the improved physician's head mirror.

The spring-controlled rings or followers 14 mounted within the double-ended socket 12 afford resilient seats for the ball members 9 and 13 and furthermore afford free and easy adjusting of the various parts disposed between the mirror 22 and the head plate 5.

It will, of course, be understood that many details of construction may be varied through a wide range without departing from the principles of this invention, and it is, therefore, not purposed to limit the patent granted hereon otherwise than necessitated by the scope of the appended claims.

I claim as my invention:

1. A physician's head mirror device comprising a head band, a plate supported thereon, a ball on said plate, a finger piece integrally formed on said plate to facilitate adjustment of the head band, a mirror, a ball thereon, a sleeve enclosing said balls, and a spring in said sleeve separating said balls.

2. A head mirror device of the class described comprising a head band, a slotted plate engaged thereon, a finger piece on said plate to facilitate adjustment of the same, a ball member rigidly secured on said plate, a double socket sleeve movably engaged on said ball member, a second ball member engaged in said sleeve, resilient means in said sleeve separating said ball members and holding the same in position, a screw stud formed on said second ball member, a mirror, and an internally threaded member on said mirror adapted to be removably engaged on said screw stud to hold the mirror in position.

3. A head mirror device of the class described comprising a head plate, a head band for supporting the same in position on a person's head, a ball member rigidly secured on said head plate, a double socket sleeve movably engaged on said ball member, a second ball member engaged in the opposite end of said sleeve, a pair of grooved followers in said sleeve between said ball members, a control spring in said sleeve with the ends of said spring seated in the grooves of said followers, a screw shank formed on said second ball member, a mirror, and an internally threaded member on the back of said mirror adapted to be removably engaged on said screw shank.

4. A head mirror device of the class described comprising a head band, a slotted plate engaged thereon, means on said plate for adjusting the head band and plate, a ball member rigidly secured on said plate, a double socket sleeve movably engaged on said ball member, a second ball member engaged in said sleeve, spring-controlled followers in said sleeve separating said ball members, a head integrally formed on said second ball member with said head having a passage therethrough, a handle member slidably engaged in said passage, a screw stud integrally formed on said head, a mirror, and an internally threaded member secured on the back of said mirror and adapted to be removably engaged on said screw stud.

5. A head mirror device of the class described comprising a head plate, a mirror, a ball member supported on said head plate, a second ball member connected with said mirror, a double socket sleeve connecting said ball members, and spring-controlled members in said sleeve seated against the ball members.

6. A head mirror device of the class described comprising a head plate, means formed thereon for adjusting the same, a mirror, a ball member supported on said plate, a second ball member removably connected with said mirror, a handle member connected with said second ball member to facilitate adjustment thereof, a double socket sleeve connecting said ball members, grooved followers in said sleeve between said ball members and affording seats for said ball members, and resilient means separating said grooved followers and acting to resiliently hold the same in contact with the ball members.

7. The combination with a physician's head band, of a mirror, a double ball spring-controlled universal joint connecting said head band with the mirror, and a shiftable handle member carried by one of the balls of said double ball universal joint to facilitate mounting of the mirror.

8. A head mirror device comprising a head band plate, means formed thereon for adjusting the same, a spring-controlled double ball universal joint supported on said plate, a handle member carried by one of the balls of said joint to facilitate adjustment thereof, a head mirror, a mirror-supporting device on the ball carrying said handle member, and means on said mirror adapted to be removably engaged on said supporting device to hold the mirror in position.

9. A physician's head mirror device comprising a head band, a plate supported thereon, means for adjusting the plate and head band, a ball member rigidly secured on said plate, a second ball member, a double socket sleeve enclosing said ball members, spring-controlled followers in said sleeve separating said ball members, a passaged head on said second ball member, a handle bar slidably engaged through said passaged head, a screw stud on said slotted head, and a mirror removably engaged on said screw stud.

10. A head mirror device of the class described comprising a head plate, a band connected therewith for supporting the same in position on a person's head, means on said plate for adjusting the plate and band, a ball member rigidly secured to said plate, a double socket sleeve movably engaged on said ball member, a second ball member engaged in said double socket sleeve, a pair of grooved followers in said sleeve, a control spring in said sleeve seated in said followers and resiliently holding said followers in contact with said ball members to afford resilient seats therefor, a head integrally formed on said second ball member, a screw stud on said head, a mirror, and an internally threaded member rigidly secured on the back of said mirror adapted to be removably engaged on said screw stud.

In testimony whereof I have hereunto subscribed my name at Chicago, Cook County, Illinois.

JOHN B. GLOWACKI.